United States Patent
Evans (10) Patent No.: US 7,385,933 B2
(45) Date of Patent: Jun. 10, 2008

(54) SYNCHRONISED DATA DELIVERY

(75) Inventor: Paul A Evans, Ipswich (GB)

(73) Assignee: British Telecommunications public limited company, London (GB)

( * ) Notice: Subject to any disclaimer, the term of this patent is extended or adjusted under 35 U.S.C. 154(b) by 974 days.

(21) Appl. No.: 10/220,495

(22) PCT Filed: Mar. 6, 2001

(86) PCT No.: PCT/GB01/00971

§ 371 (c)(1),
(2), (4) Date: Aug. 30, 2002

(87) PCT Pub. No.: WO01/69853

PCT Pub. Date: Sep. 20, 2001

(65) Prior Publication Data

US 2003/0021231 A1    Jan. 30, 2003

(30) Foreign Application Priority Data

Mar. 17, 2000    (EP)    .................................. 00302201

(51) Int. Cl.
*H04L 1/00* (2006.01)
*H04J 3/14* (2006.01)
*H04L 12/54* (2006.01)

(52) U.S. Cl. ...................................... 370/252; 370/428

(58) Field of Classification Search ................ 370/252, 370/428, 503, 517, 519, 352, 401
See application file for complete search history.

(56) References Cited

U.S. PATENT DOCUMENTS

| | | | |
|---|---|---|---|
| 5,521,907 A | 5/1996 | Ennis, Jr. et al. | |
| 5,740,161 A | 4/1998 | Porter et al. | |
| 6,009,077 A * | 12/1999 | Firoiu et al. | 370/230 |
| 6,038,230 A | 3/2000 | Ofek | |
| 6,442,135 B1 * | 8/2002 | Ofek | 370/229 |
| 6,549,514 B1 * | 4/2003 | Kilkki et al. | 370/231 |
| 6,577,604 B1 * | 6/2003 | Fisher | 370/252 |
| 6,970,481 B2 * | 11/2005 | Gray et al. | 370/519 |
| 2002/0054606 A1 * | 5/2002 | Takeda et al. | 370/468 |

OTHER PUBLICATIONS

International Preliminary Examination Report dated Oct. 8, 2001.

(Continued)

*Primary Examiner*—Chau Nguyen
*Assistant Examiner*—Marcus R Smith
(74) *Attorney, Agent, or Firm*—Nixon & Vanderhye P.C.

(57) ABSTRACT

A data distribution system provides capability for synchronized delivery of data elements to each of a set of receivers. In the system, a number of forwarding computers are linked together in a predetermined configuration by a communications network. An originating forwarding computer receives a data element from a source and forwards it to one or more predetermined destination forwarding computers of the system for delivery to receivers. Each forwarding computer operates a cyclical monitoring process to measure at least one characteristic known to contribute to delay in transferring a data element between forwarding computers, calculating the maximum expected delay for each cycle. On forwarding a data element, an originating forwarding computer calculates a prescribed time for delivery to a receiver by a destination forwarding computer taking account of the maximum expected delay at that time, writing the prescribed delivery time into the data element being forwarded. The system is adaptive to varying network performance in maintaining synchronized delivery.

5 Claims, 5 Drawing Sheets

OTHER PUBLICATIONS

Helbig et al., "An Architecture for a Distributed System Synchronisation Service", <<helbig96architecture.pdf>>, Mar. 4-6, 1996.

Bloks, The IEEE-1394 High Speed Serial Bus Philips Journal of Research, Elsevier, Amsterdam, NL, vol. 50, No. 1, 1996, pp. 209-216.

Escobar et al., "Flow Synchronization Protocol" Proceedings of the Global Telecommunications Conference (GLOBECOM), New York, IEEE, US, vol. 3, Dec. 6, 1992, pp. 1381-1387.

Xu et al., "Synchronized End-to-end Multicast in Real-Time Packet Cellular Networks", Proceedings IEEE Military Communications Conference, [Online] Oct. 1998, pp. 1-5.

* cited by examiner

SYNCHRONISED DATA DELIVERY

This application is the U.S. national phase of international application PCT/GB01/00971 filed 6 Mar. 2001 which designated the U.S.

BACKGROUND

1. Technical Field

This invention relates to distribution of data elements by transmitters connected to a communications network to enable timed delivery to a set of one or more receivers.

2. Related Art

In network terminology, sending a data element (i.e. a message, packet, frame or the like) across a network to a single recipient is known as unicasting. Sending a data element to all receivers connected to a network is known as broadcasting. Sending a data element to a set of recipients that form a subset of all receivers connected to a network is referred to as multicasting. Such a set of recipients is known as a multicast group.

In broadcast networks (e.g. nearly all Local Area Networks), all receivers receive any data element placed on the network. Each receiver has a network interface card that identifies packets that are intended for that receiver. In order to identify which multicast data elements are intended for that receiver, the network interface card must store an indication of each multicast address for which the receiver is a recipient.

In networks comprising switching nodes interconnected by point-to-point links, each switching node must store, for each multicast group, an indication of which of the links connected to it lead toward members of the multicast group.

Multicasting techniques are being used increasingly to distribute sets of information and other types of data over a communications network to groups of users. Such techniques can be particularly advantageous in the distribution of multi-category data where different users require receipt of different categories of data. Rather than unicasting data representing different data categories to each user individually according to their particular requirements, in many cases sending the same data sets repeatedly over a network, multicast techniques enable each data set to be sent only once, with consequent savings in network use. For example, by transmitting data sets in each data category over a different multicast address, users may elect to listen on only a selected subset of the available addresses in order to receive only data sets in those respective categories of interest.

In a typical multi-casting arrangement, a hierarchy of forwarding computers, interconnected by a multicast-enabled communications network, is arranged to distribute data elements from a source of data elements to one or more receivers, the source and each receiver being linked to a forwarding computer within the hierarchy. Forwarding computers may be arranged to use, for example, internet protocols such as IP to transport data elements over the communications network. However, delivery of a data element to a number of different receivers over a IP-based communications network does not provide any guarantee that the data element will arrive and hence be available to those receivers simultaneously. Delivery is generally carried out on a "best effort" basis. When distributing a data element conveying a particularly important item of information to a number of receivers, late delivery of such information to one receiver as compared to another may result in an unfair advantage to the first receiver of such information. The information released may be highly influential on stock market prices, for example.

BRIEF SUMMARY

According to a first aspect of the present invention, there is provided a forwarding computer for use in a data distribution system comprising a plurality of forwarding computers, linked by a communications network, for forwarding data elements from a source of data elements to one or more receivers accessible to forwarding computers of the system, said forwarding computer having:

an input for receiving a data element to be forwarded;

timer means;

monitoring means for monitoring at least one predetermined characteristic contributive to delay in transferring a data element between forwarding computers of the system and to periodically output data indicative of the contribution to delay due to each said monitored characteristic;

calculating means operable to calculate, from an output of the monitoring means, a maximum expected delay in transferring a data element from said forwarding computer to a destination forwarding computer for delivery to a receiver and thereby to calculate, at a time indicated by the timer means, a current prescribed time for delivery of the data element to a receiver by said destination forwarding computer; and forwarding means operable to write into a received data element a current prescribed time for delivery as calculated by said calculating means, and to forward the received data element.

While the present invention finds particular application with multicasting arrangements involving a hierarchy of participating forwarding computers, the synchronised distribution arrangement of the present invention may be applied to communication between servers in other network arrangements or network types requiring synchronised delivery of data elements at two or more destinations.

Preferably, in the forwarding computer, the calculation means are operable to calculate a maximum expected delay in respect of a predetermined probability that the delay in forwarding a data element from said forwarding apparatus to a destination forwarding apparatus of the system will exceed the maximum expected delay.

One or more values of maximum delay may be calculated so that, on average, no more than one data element in n data elements will be delivered to a receiver at a later time than that specified on the basis of the calculated maximum delay. Several values of maximum delay may be calculated according to different values for n, offering the option of differing levels of service according to the criticality of synchronised delivery to receivers. Maximum delays may be calculated for example for three values of n: 10 000; 1 million; and 100 million. A data element may be distributed on the basis of n=100 million if synchronised delivery to a number of receivers is critical, or n=10000 if less critical.

BRIEF DESCRIPTION OF THE DRAWINGS

There now follows, by way of example only, a description of specific embodiments of the present invention. This description is to be read in conjunction with the accompanying drawings, of which.

DETAILED DESCRIPTION OF EXEMPLARY EMBODIMENTS

Figure 1:
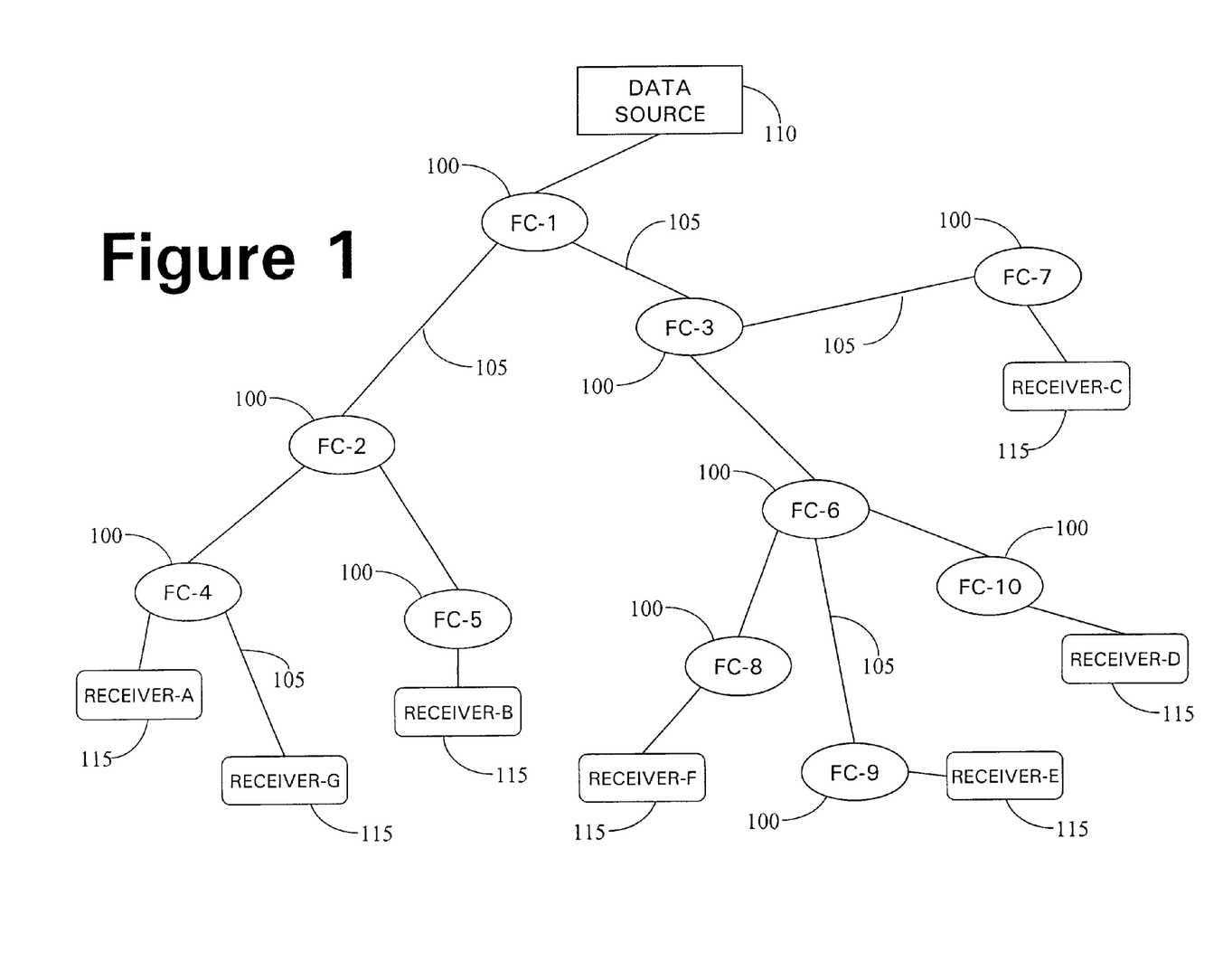
FIG. 1 is a diagram representing a logical hierarchy of forwarding computers.

Referring to FIG. 1, a diagram is provided showing in schematic form a simple hierarchy of forwarding computers 100 (FC1 to FC10) with links 105 of a communications network interconnecting selected pairs of forwarding computers 100 according to a predetermined structure for the hierarchy. A "forwarding computer" may be any computer apparatus arranged to carry out forwarding of a data element to one or more destinations over the communications network according to an address conveyed by the data element of an intended receiver. The forwarding computer has one or more interfaces to the communications network to enable receipt and transmission of data elements.

In the example of FIG. 1, the hierarchy extends from forwarding computer FC-1 at the "top" to forwarding computers FC-4, FC-5, FC-7, FC-8, FC-9 and FC-10 at the "ends" of the hierarchy. To the "top" forwarding computer FC-1 is linked a source of data elements 110 and to one or more of the "end" forwarding computers are linked receivers 115 of data elements (RECEIVER-A to RECEIVER-G). Users, not shown in FIG. 1, may be linked in turn to receivers 115 to gain access to data elements distributed from the data source 110 by the hierarchy of forwarding computers.

In a preferred hierarchy, there are several levels between a "top" forwarding computer and an "end" forwarding computer. Each forwarding computer below the top level of the hierarchy has a single "parent" forwarding computer and may have one or more "child" forwarding computers in the level below it. In the example of FIG. 1, forwarding computer FC-2 has, as parent, forwarding computer FC-1 and, as children, forwarding computers FC-4 and FC-5. At the time of configuring the hierarchy, the address of the respective parent forwarding computer, if any, is stored within each forwarding computer together with an indication of the addresses of any child forwarding computers. Preferably, though not essentially, the communications network interlinking forwarding computers 100 is multicast-enabled such that multicast techniques may be used to transport data elements from the source of data elements 110 to selected receivers 115. With appropriate use of multicast addresses, forwarding computers may use one of a number of techniques to forward data elements along predetermined lines of forwarding computers through the hierarchy to ensure that a data element reaches one or more intended receivers 115.

The Applicant's co-pending international patent application number PCT/GB99/03114 describes a method for forwarding data elements by forwarding computers over a multicast-enabled network using multicast addresses that are pre-assigned to the different sets of potential receivers of such data elements. Each forwarding computer in the hierarchy has access to a respective forwarding table specifying the forwarding destination or destinations for a received data element addressed to a particular multicast address. The paths through the hierarchy are thus predefined according to the multicast address used (and hence the intended set of receivers) when forwarding a data element. Thus, in the example of FIG. 1, to distribute a particular data element from the source 110 to a predetermined set of receivers 115, forwarding computer FC-1 selects a preassigned multicast address representing the predetermined set of receivers and, according to the contents of its forwarding table, forwards the data element using that address. If only a single receiver is required, then a pre-assigned unicast address may be used for that receiver.

There now follows an overview of the main principles in operation of a forwarding computer 100, one in a hierarchy of forwarding computers, in order to achieve a synchronised delivery of data elements according to preferred embodiments of the present invention. A more detailed description of the operation of a forwarding computer according to a preferred embodiment of the present invention will then follow the overview.

Preferably, synchronised delivery of data elements will only be attempted within the hierarchy between an originating forwarding computer (e.g. FC-1)—the first recipient of a data element to be distributed from a source 110 of data elements—and a destination forwarding computer (e.g. FC-9)—the forwarding computer linked to an intended receiver 115 (e.g. RECEIVER-E) of the data element. The final stage in delivery of a data element from a destination forwarding computer to a receiver linked thereto is assumed to involve a minimal or otherwise consistent delay among receivers of the data element.

In order to achieve synchronised delivery of a data element to a number of receivers 115, each of the forwarding computers 100 in the hierarchy described above are arranged to generate and to have access to two main types of information. Firstly, each forwarding computer 100 is arranged with access to a common synchronised time signal. Access to the time signal may be provided by one of a number of possible means. For example, a Global Positioning System (GPS) receiver may be provided at each forwarding computer 100 to give access to accurate time information. Alternatively, a network timing protocol such as NTP, described in Internet Request for Comments (RFC) 1305 as published on the Internet by the Internet Engineering Task Force, by may be implemented to convey time information to each of the forwarding computers, or, more likely in practice, NTP may convey time information from a GPS receiver to a localised group of forwarding computers within the hierarchy, interconnected by a metropolitan area network with the GPS receiver serving that area network.

The second type of information relates to the maximum expected downstream delay in forwarding a data element from an "originating" forwarding computer (the first recipient within the hierarchy of a data element to be distributed) to a "destination" forwarding computer (the final "staging post" before the receiver itself). To obtain such information, each of the forwarding computers 100 is arranged to operate a "background" process for monitoring a predetermined set of network characteristics, over a predetermined monitoring time period, for that part of the communications network linking the forwarding computer to its child forwarding computers, if any, below it in the hierarchy. The network characteristics chosen for monitoring are those likely to make the most significant contribution to the delay in forwarding a data element from one forwarding computer to another.

The background process operated by forwarding computers 100 calculates the maximum downstream delay that would be expected in transmitting a data element from an originating forwarding computer to any destination forwarding computer below it ("downstream") in the same branch of the hierarchy. The process operates on a cyclic basis, the calculation of maximum downstream delay being based upon data gathered by the forwarding computers for particular network characteristics during each monitoring time period. The duration of the monitoring period and hence the process cycle frequency is set according to the rate at which the hierarchy is required to adapt to changing network conditions. Those forwarding computers (e.g. FC-4, FC-9) at the lowest levels in the hierarchy—those having no child forwarding computers below them—may be arranged to control the start of each monitoring cycle, as will be described below, but otherwise do not calculate downstream delays, there being no downstream portion other than to receivers.

Thus an originating forwarding computer having access to a synchronised time signal, and to information on the maximum downstream delay expected at a particular time (over the latest monitoring cycle) may calculate the latest expected time of arrival of a forwarded data element at a downstream destination forwarding computer. On receiving a data element to be distributed, an originating forwarding computer may use such delay information in a number of different ways to help to ensure synchronised delivery of the data element to the relevant destination forwarding computers and hence to intended receivers 115.

Preferably, each forwarding computer 100 is responsive to timing information inserted into a data element by the originating forwarding computer, specifying the time for delivery of the data element to receivers 115. Each destination forwarding computer is therefore arranged to cache a received data element, intended for delivery to one or more receivers 115 linked to that destination forwarding computer, until the specified time arrives—as determined according to the synchronised time signal for example—and thereupon to deliver the data element to an intended receiver 115. The time specified by the originating forwarding computer for delivery to receivers 115 is calculated to allow sufficient time for the data element to arrive at all relevant destination forwarding computers with no more than a predetermined probability of arriving later than the specified delivery time. As will be described below, a forwarding computer may provide a number of different options for maximum downstream delay according to the level of risk of unsynchronised delivery that a source or receivers of data elements are prepared to accept.

Steps in operation by a forwarding computer 100 of a "background" process for determining the maximum downstream delay will now be described in outline with reference to FIG. 2, according to a preferred embodiment of the present invention. The background process operates on the basis that a particular forwarding computer 100 is able to determine the downstream delay, directly, only for that section of the communications network linking it to each of its "child" forwarding computers. The aggregate downstream delay for levels below each of the "children" may be communicated upwards to the particular forwarding computer in a "maximum downstream delay" (MDD) message, sent by each of the children. As mentioned above, determination of the maximum downstream delay may operate on the basis of monitoring cycles, each monitoring cycle being triggered by those forwarding computers at the "ends" of the hierarchy (those with no child forwarding computers). Preferably, a monitoring cycle may be started by each "end" forwarding computer sending, at a predetermined frequency, an initiating maximum downstream delay (MDD) message to their respective parent forwarding computer, the MD message specifying a downstream delay of zero. The period between successive initiating messages may be set for example by a system administrator according to how quickly the hierarchy of forwarding computers is required to adapt to changing network conditions. A period of 0.25 to 1.00 second between successive MDD messages is suggested.

Figure 2:
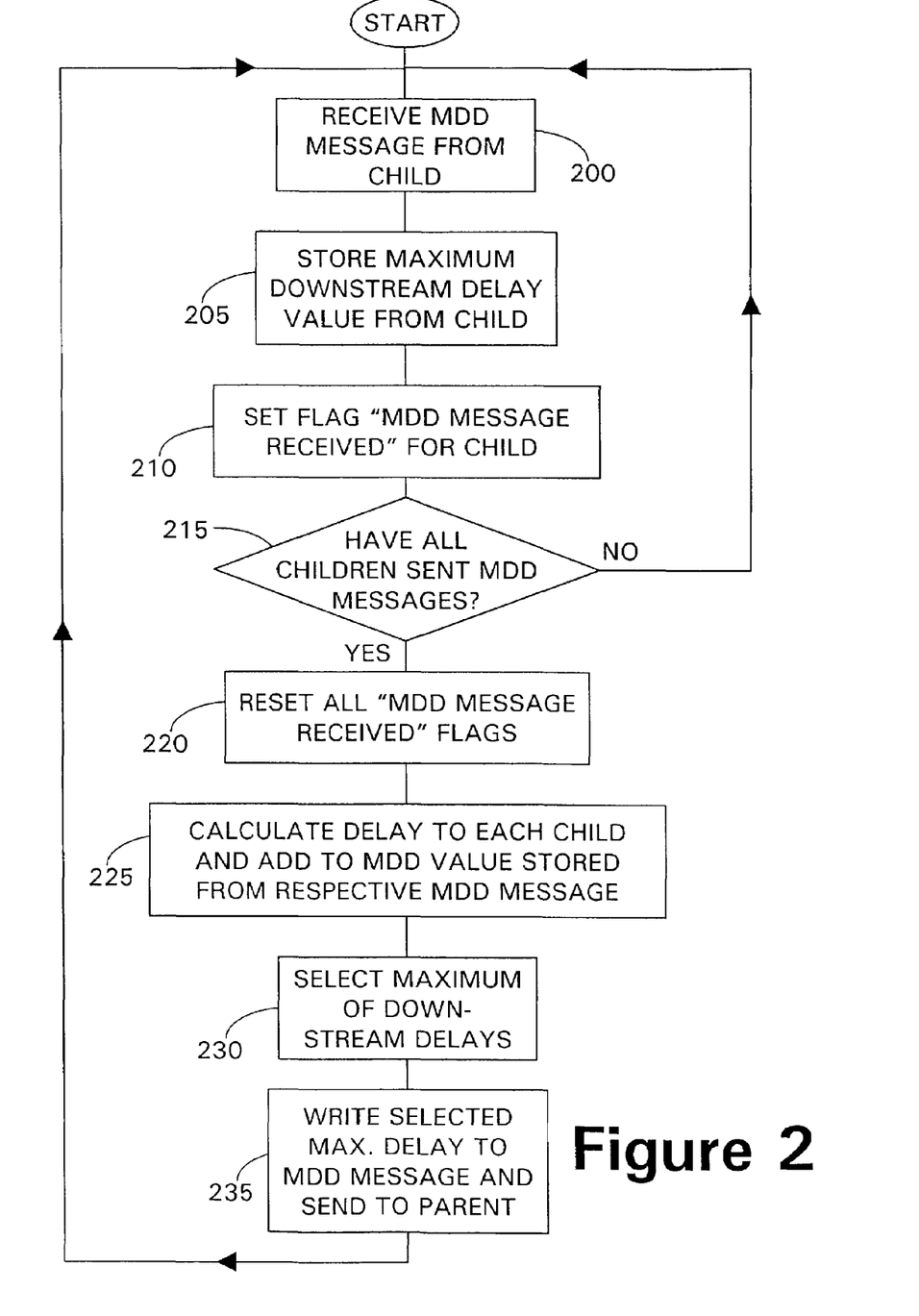
FIG. 2 is a flow diagram showing steps in operation of a forwarding computer process for determining downstream delay according to a preferred embodiment of the present invention.

Referring to FIG. 2, at STEP 200, a present forwarding computer receives a new maximum downstream delay (MDD) message from one of its child forwarding computers. At STEP 205 the value of maximum downstream delay supplied in the message is stored. At STEP 210, a flag is set to indicate that a new MDD message has been received from that child. At STEP 215, the present forwarding computer determines whether all of its child forwarding computers have now sent an MDD message for the current monitoring cycle. If not, then processing returns to STEP 200 to await any further expected MDD messages for the current cycle.

If, at STEP 215, MDD messages have been received from each child, then at STEP 220, all the flags indicating receipt of an MDD message from a child are reset, indicating that a new cycle of data gathering in respect of the predetermined network characteristics is to begin. At STEP 225, the present forwarding computer is triggered to calculate and store the downstream delay between itself and each of the child forwarding computers linked to it, using data gathered in respect of the predetermined network characteristics during the latest monitoring period, and to add the calculated values for each child to the respective values supplied in received MDD messages and stored at STEP 205 to give the aggregate delay via each child. At STEP 230, the present forwarding computer selects the maximum of the aggregate downstream delays calculated at STEP 225 and at STEP 235, if there is a parent forwarding computer to the present forwarding computer, writes the selected maximum delay into an MDD message and sends it to its predetermined parent. Processing then returns to STEP 200 to await the first of a new set of MDD messages in respect of a new monitoring cycle.

The present forwarding computer may be arranged to send an acknowledgement message to the child sending an MDD message. Additionally, if the present forwarding computer does not receive an acknowledgement message from its parent, within a predetermined timeout period, in respect of a recently sent MDD message, then the MDD message may be re-sent.

As mentioned above and as will be described in detail below, each of the forwarding computers may be arranged to calculate, at step 225 of FIG. 2, more than one value for the maximum downstream delay, each value allowing for a different predetermined probability that a data element will take a longer period than predicted to arrive at a downstream destination forwarding computer. An MDD value in respect of each probability may be included in an MDD message and processed separately by each forwarding computer as it is passed up through the hierarchy. In this way a source of data elements or a group of receivers may select one of the available options relating to differing levels of risk that a data element will not be delivered to a receiver at the same time as to other receivers. The originating forwarding computer may then select the appropriate maximum downstream delay from those communicated in the latest received MDD message and use that delay value to calculate an appropriate delivery time to be specified in a forwarded data element.

Details will now be provided for a preferred set of network and other characteristics and, where appropriate, a method by which a forwarding computer may measure them, for use in determining the maximum downstream delay at STEP 225 of FIG. 2.

In a preferred embodiment of the present invention, three characteristics are used to determine the delay:

(1) Loss of data elements forwarded over a link between a parent and child forwarding computer;

(2) Latency of a link between a parent and child forwarding computer;

(3) Delay due to processing by a forwarding computer.

Preferably, the first two characteristics may be monitored automatically by a forwarding computer. The third characteristic is unlikely to vary significantly during normal operation of a forwarding computer, but may vary for example with installation of upgraded controlling software or with changes to the number of linked child forwarding computers. The delay due to a forwarding computer may therefore be determined by experiment each time a change is made to its configuration and a new value adopted in the calculation of downstream delay.

A present forwarding computer may measure loss of data elements over the link to each of its child forwarding computers by monitoring the normal forwarding of data elements to, and receipt of acknowledgements from the respective child forwarding computer. An acknowledgement table may be maintained to keep a count of data elements forwarded to each child forwarding computer during a monitoring cycle and corresponding acknowledgements received from each respective child. Steps in operation of a forwarding computer in gathering acknowledgement data over a monitoring cycle will now be described with reference to FIG. 3.

Figure 3:
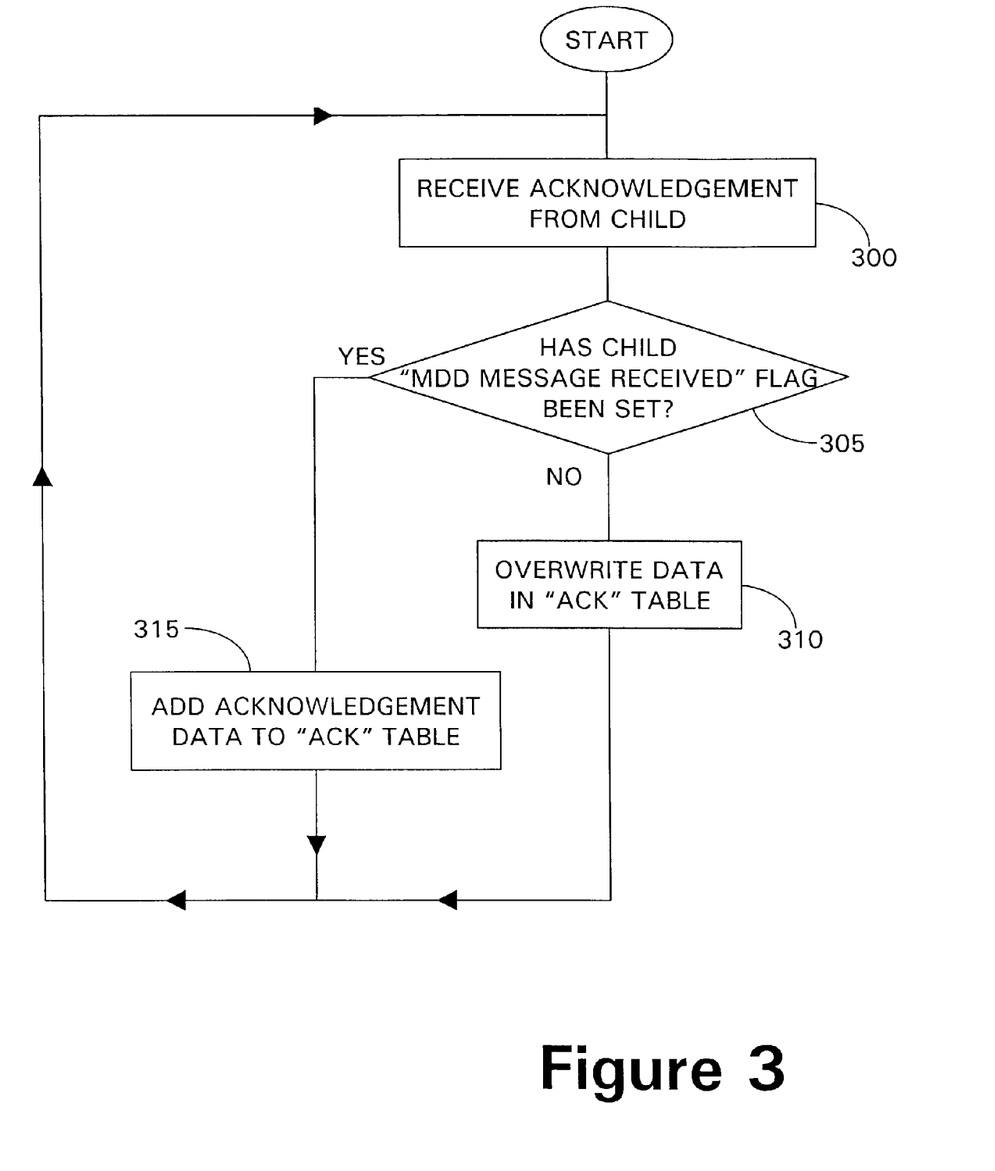
FIG. 3 is a flow diagram showing steps in operation of a forwarding computer process for monitoring loss of data elements.

Referring to FIG. 3, at STEP 300 an acknowledgement is received from a child forwarding computer in response to a forwarded data element. At STEP 305, the status of the "MDD message received" flag is checked in respect of the child forwarding computer sending the acknowledgement and, if found to have been set (from STEP 210 of FIG. 2), then at STEP 315 the received acknowledgement is added to the acknowledgement table in respect of that child, a monitoring cycle being already in progress. If, at STEP 305, the flag has been reset (from STEP 220 of FIG. 2), then a new monitoring cycle has been triggered and at STEP 310 the received acknowledgement overwrites accumulated data in the acknowledgement table in respect of that child. Processing then returns to STEP 300 to receive further acknowledgements.

When calculating the delay to each child forwarding computer at STEP 225 of FIG. 2, the present forwarding computer calculates the loss of data elements for each child as the ratio of acknowledgements received over data elements forwarded during the latest monitoring cycle, as recorded for each child in the acknowledgement table.

A skilled person would be able to implement a suitable technique for gaining access to acknowledgement information, according to the type of data transport protocol used between forwarding computers.

Similarly, a skilled person would be able to implement a suitable technique to measure latency over the links to each of the child forwarding computers. Preferably, where TCP/IP is used to transport data elements between forwarding computers, use may be made of the PING or TRACEROUTE utilities during periods of low traffic to measure the link latency to the child. Use of such utilities is described in the book "TCP/IP Illustrated, Volume 1: The Protocols" (Addison-Wesley Professional Computing Series) by W. Richard Stevens. The most recently measured values of latency are stored at the present forwarding computer for use in the calculation at STEP 225.

Delay due to processing of the present forwarding computer may be set according to an experimental measurement of the performance of the forwarding computer. A typical value for the delay may be 20 milliseconds (ms) if a relatively "slow" processor is installed, or 5 ms for a "fast" processor.

Using values of data element loss, link latency and processing delay, the present forwarding computer may calculate, at STEP 225, a downstream delay D to each of the child forwarding computers for each of three levels of probability that a data element will arrive at a child later than the calculated delay D, using the following formula:

$$D = (1 + \log_{(1/r)} P)(f + t)$$

where: D is the delay (expressed in ms);

P represents the probability such that no more than one data element in P data elements will take longer than the delay D to arrive at the respective child forwarding computer;

r is the proportion of data elements lost during the monitoring period;

f is the present forwarding computer processing delay (expressed in ms);

t is the latency of the link (expressed in ms).

Steps in operation of a forwarding computer in two scenarios will now be described with reference to FIG. 4. In the first scenario, the forwarding computer is an "originating" forwarding computer—the first forwarding computer within the hierarchy to receive, from a data source 110, a data element to be distributed. Steps in operation of an "originating" forwarding computer will be described with reference to FIG. 4*a*. In the second scenario, the forwarding computer is a "destination" forwarding computer—a last forwarding computer within the hierarchy to receive a data element before delivery to a receiver 115 linked thereto. Steps in operation of a "destination" forwarding computer will be described with reference to FIG. 4*b*.

Figure 4A:
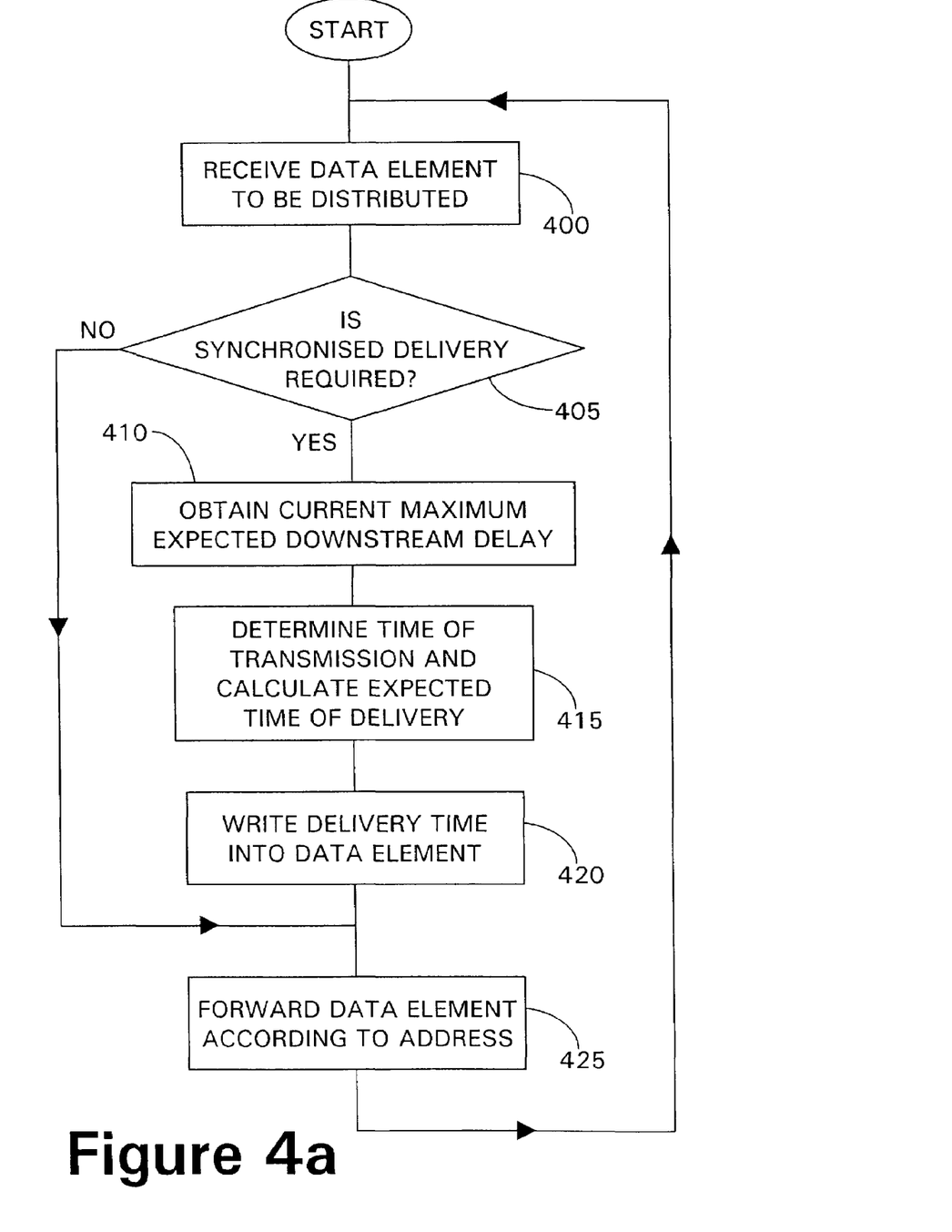
FIGS. 4a and 4b shows two flow diagrams showing steps in operation of a forwarding computer in forwarding a data element for synchronized delivery to receivers according to a preferred embodiment of the present invention.

Referring to FIG. 4*a*, at STEP 400, the originating forwarding computer receives a data element to be distributed from the data source 400. At STEP 405, the requirement for synchronised delivery to receivers is checked. If synchronised delivery is not required, then at STEP 425 the received data element is forwarded according to a predetermined address. However, if at STEP 405 synchronised delivery is required, then at STEP 410 the originating forwarding computer obtains the latest calculated maximum downstream delay as determined by the background process running on this and the other forwarding computers as described above. At STEP 415 the originating forwarding computer determines the time of transmission of the data element, e.g. from the synchronised time source, including an allowance for the remaining processing steps before actual forwarding, and to this time adds the maximum expected delay to obtain a time for delivery of the data element by the destination forwarding computer. At STEP 420, the originating forwarding computer then writes the time for delivery into the data element and at STEP 425 the data element is forwarded according to the predetermined address. Processing then returns to STEP 400 to await the next data element to be distributed.

Figure 4B:
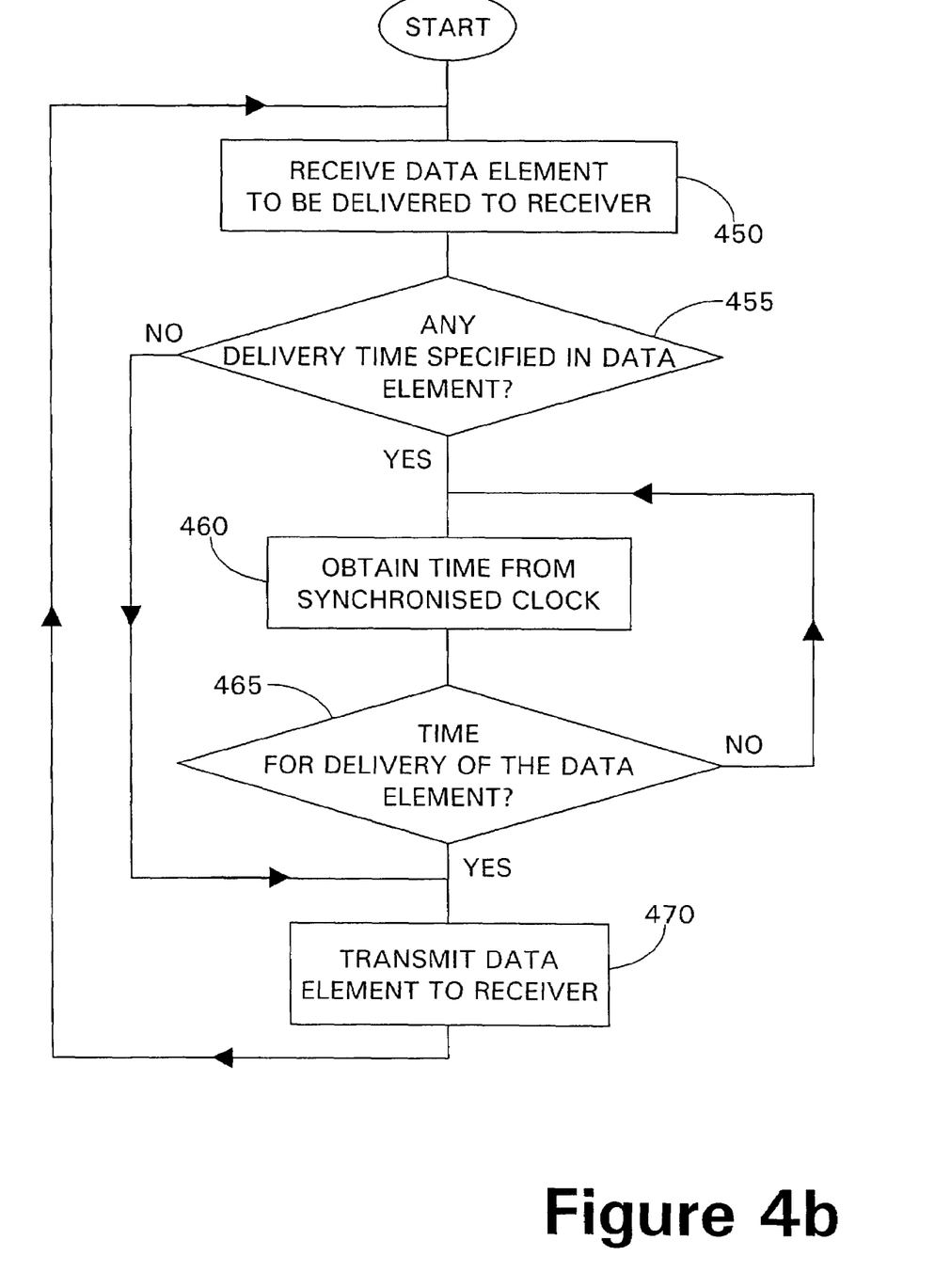

Referring to FIG. 4*b*, at STEP 450, the destination forwarding computer receives a data element that has been forwarded down through the hierarchy of forwarding computers for delivery to one or more predetermined receivers by the destination forwarding computer. At STEP 455, the destination forwarding computer determines whether or not the received data element includes a specified delivery time. If no delivery time is found at STEP 455, then synchronised delivery to receivers was not intended and at STEP 470 the received data element is transmitted to the one or more predetermined receivers without reference to the time.

If, at STEP 455, the received data element is found to specify a time for delivery, then at STEP 460 the current time is obtained, e.g. from a synchronised time signal or clock. At STEP 465, if the current time matches or exceeds the specified time for delivery, then at STEP 470 the data element is transmitted to the one or more predetermined receivers. If, at STEP 465, time for delivery has not yet arrived, then the process loops via STEP 460 until the time for delivery arrives.

Having transmitted the data element to the predetermined receivers or receivers, processing returns to STEP 450 to await further data elements for delivery to receivers linked to the present destination forwarding computer.

It will be clear that embodiments of the present invention may be applied to other data distribution arrangements using different network configurations in which synchronised delivery of data elements is required to a set of receivers. Any network arrangement in which paths through the network may be monitored to determine the likely maximum time for transfer of a data element would potentially benefit from the application of embodiments of the present invention.

What is claimed is:

1. A forwarding apparatus for use in a data distribution system comprising a plurality of forwarding apparatuses linked by a communications network for forwarding data elements from a source of data elements to at least one receiver accessible to a forwarding apparatus of the system, said forwarding apparatus comprising:
   an input for receiving a data element to be forwarded;
   timer means;
   monitoring means for repeatedly monitoring at least one predetermined characteristic contributing to delay in transferring a data element between forwarding apparatuses of the system and to periodically output data indicative of the contribution to delay due to each said monitored characteristic;
   calculating means operable to calculate, from an output of the monitoring means, a maximum expected delay in transferring a data element from said forwarding apparatus to a destination forwarding apparatus for ultimate delivery to a receiver and thereby to calculate, at a time indicated by the timer means, a current prescribed time for delivery of the data element to a receiver by said destination forwarding apparatus; and
   forwarding means operable to write into a received data element a current prescribed time for delivery as calculated by said calculating means, and to forward the received data element;
   wherein said calculation means is operable to calculate a maximum expected delay associated with a predetermined probability that the delay in forwarding a data element from said forwarding apparatus to a destination forwarding apparatus of the system will exceed the maximum expected delay.

2. A forwarding apparatus according to claim 1 further provided with synchronization means for synchronizing the timing means of a source forwarding apparatus with timing means of the destination forwarding apparatus.

3. Apparatus according to claim 1 comprising a computer.

4. A method for forwarding data elements from a source of data elements to one or more receivers in a data distribution system comprising a plurality of forwarding sites linked by a communications network, said method comprising, at each forwarding site:
   receiving a data element to be forwarded;
   repetitively monitoring at least one predetermined characteristic contributing to delay in transferring a data element between forwarding sites;
   calculating a maximum expected delay time in transferring a data element from said forwarding site to a destination forwarding site and to a receiver based on said at least one monitored characteristic and upon similar maximum expected delay time data received from at least one other forwarding site if located closer to said receiver and using said calculated maximum delay time to calculate a current prescribed time for delivery of a data element to a receiver by said destination forwarding site; and
   forwarding said data element onward for delivery by a destination forwarding site at said prescribed time for delivery;
   wherein said calculated maximum expected delay time is calculated so as to have a predetermined probability that the delay in forwarding a data element from said forwarding site to a destination forwarding site of the system will exceed the maximum expected delay.

5. A method as in claim 4 further comprising:
   synchronizing data representing current time at all said forwarding sites.

* * * * *